June 29, 1948.  J. H. GRAY  2,444,291
AIRPLANE AIR BRAKE
Filed April 19, 1947  4 Sheets-Sheet 1
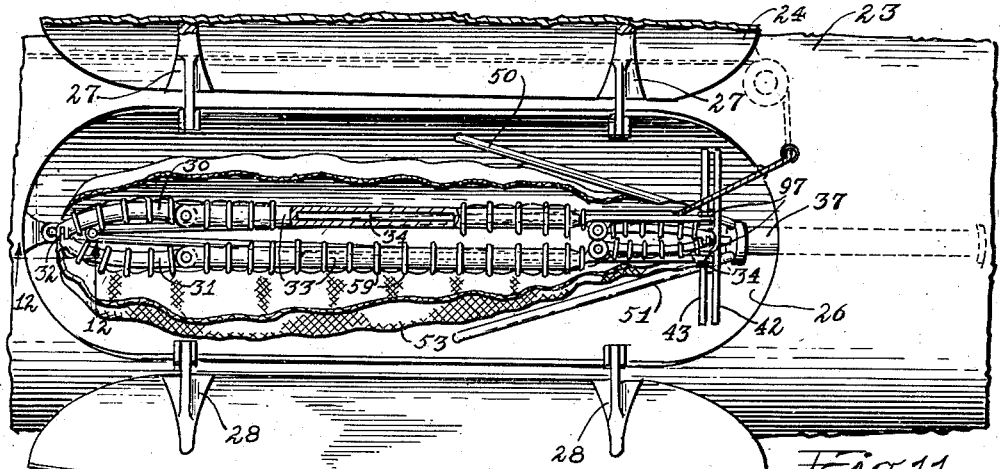
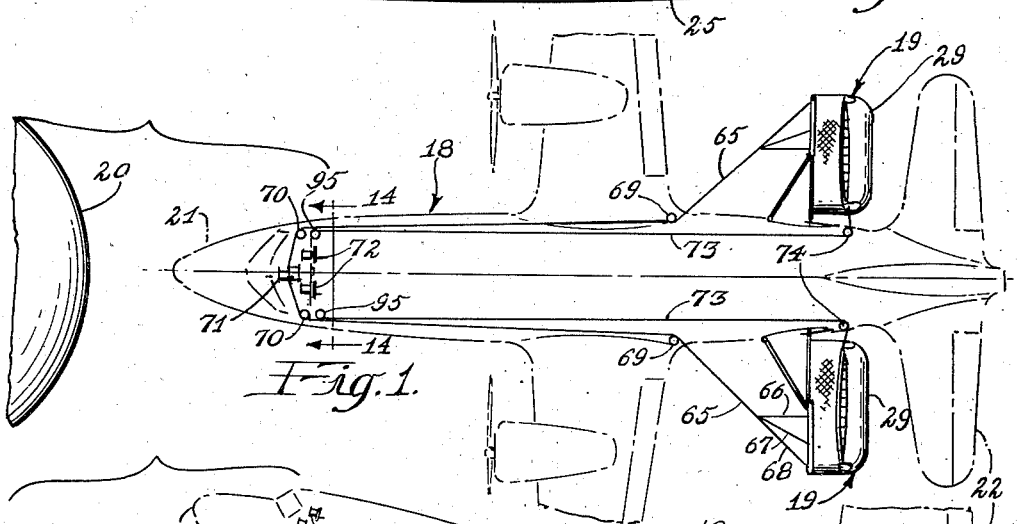
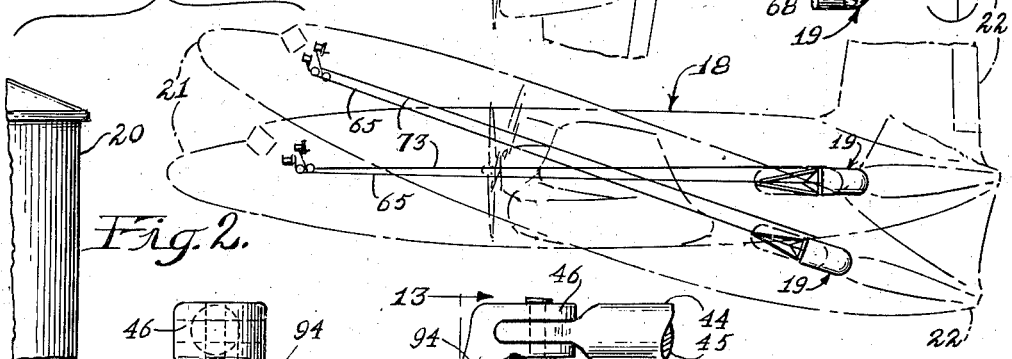
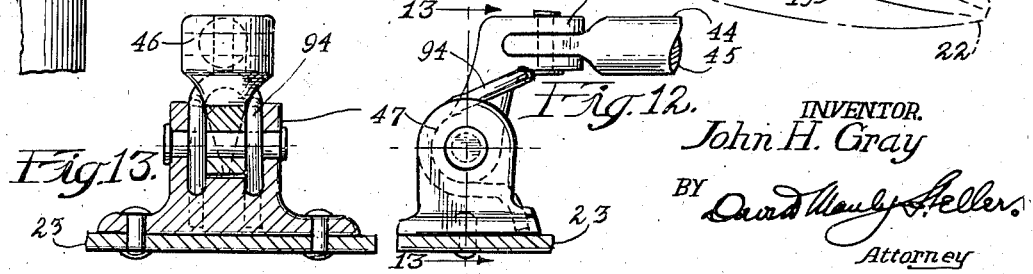
INVENTOR.
John H. Gray
BY
Attorney June 29, 1948. J. H. GRAY 2,444,291
AIRPLANE AIR BRAKE
Filed April 19, 1947 4 Sheets-Sheet 2
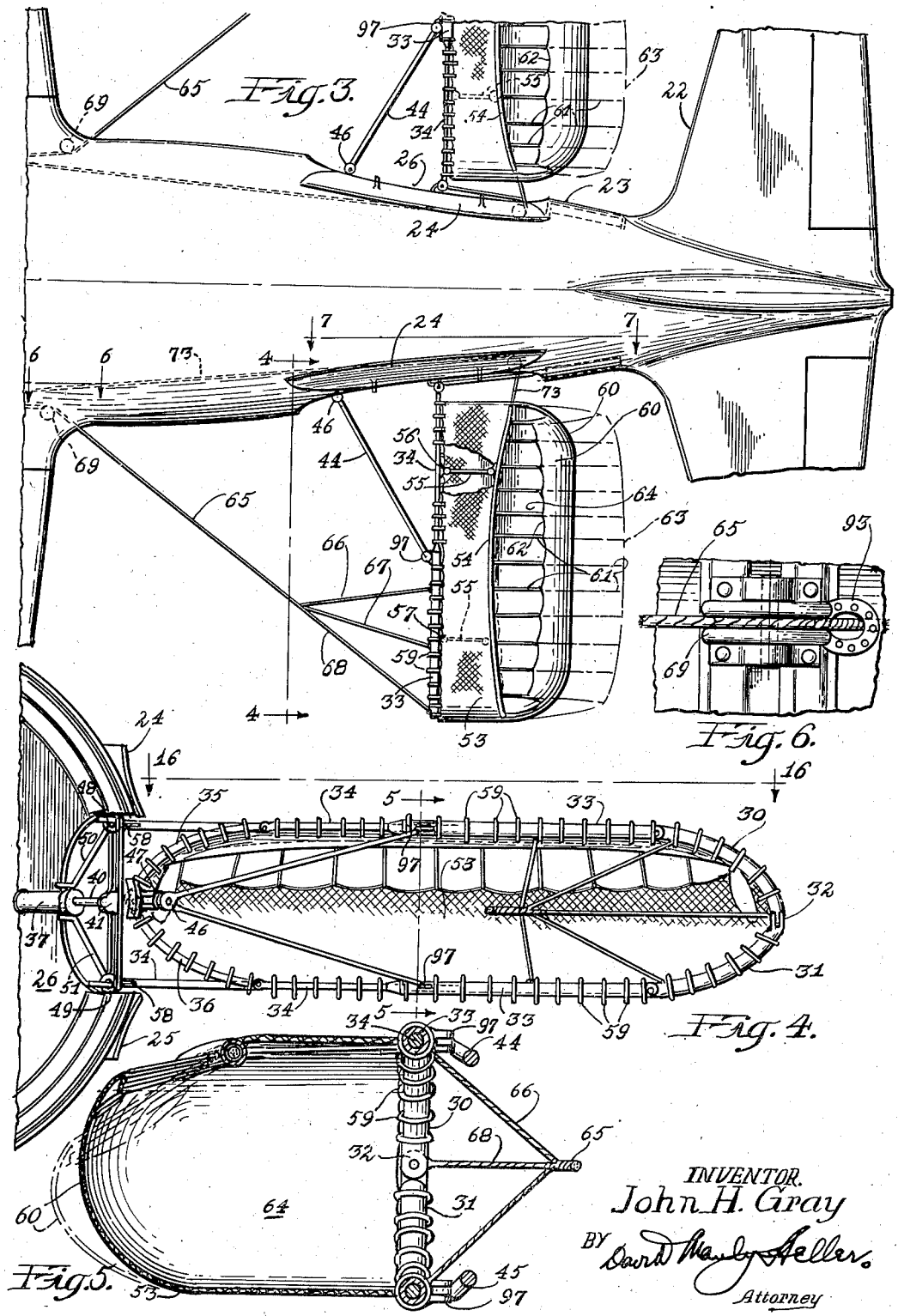
INVENTOR.
John H. Gray
BY David Manly Heller
Attorney June 29, 1948.　　　　J. H. GRAY　　　　2,444,291
AIRPLANE AIR BRAKE
Filed April 19, 1947　　　　　　　　　　　　　　4 Sheets-Sheet 3

INVENTOR.
John H. Gray
BY
Attorney

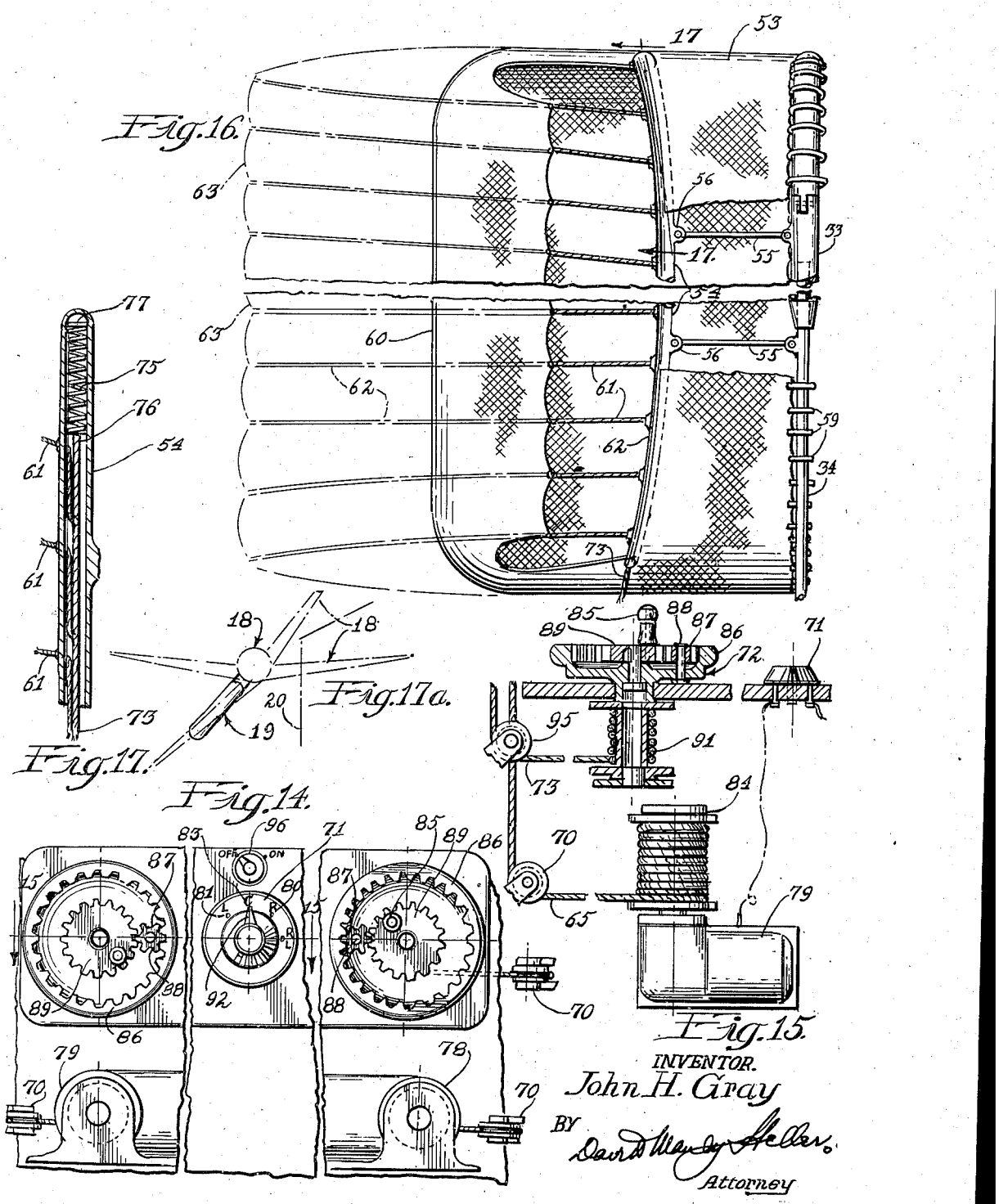

Patented June 29, 1948

2,444,291

UNITED STATES PATENT OFFICE 2,444,291

AIRPLANE AIR BRAKE

John H. Gray, Chicago, Ill.

Application April 19, 1947, Serial No. 742,658

12 Claims. (Cl. 244—113)

My invention relates to airplane air braking means.

An important object of my invention is to provide means for braking the horizontal movement of an airplane moving in a horizontal direction.

Another object of my invention is to provide braking means which may be variably controlled so as to lower the tail of the plane and, consequently, to raise the nose of the plane to avoid striking obstacles, such as tall buildings immediately ahead and in the course or path of travel of the plane.

Another object of my invention is to provide airplane air brake means, consisting of collapsible pouches, supported articulately on each side of the aft fuselage of the plane, being collapsible and foldable so as to be completely concealed within suitable pockets in the aft fuselage of the said plane when the said pouches are to be set to inoperative position.

Another object of my invention is to provide control means for varying, applying, or setting to operative position either of the said pouch brakes, or both of the said pouch brakes, to operate simultaneously. When operating either of the said pouches independently, the resultant action will be to produce an angular movement of the plane about its longitudinal axis, permitting a side or wing thereof to be caused to rise in order to clear a lateral obstruction.

A further object of my invention is to provide brake means which will facilitate the landing of a plane so that, when the braking action is effected, it will maintain the nose of the plane in a horizontal position preventing the same from dipping downwardly to strike the ground and cause damage to the plane.

Another object of my invention is to provide pouch means for varying the braking action by varying the wind pressure, or for completely nullifying the air resistance passing through the said pouch means when it is desired to fold the same and retract them to inoperative position.

Another object of my invention is to provide pouches concealed when in inoperative position, and which are brought to operative position first by actuating means which will open the trap doors of the aft fuselage end of the fuselage, making available access to the pocket in which the said pouches are mounted; the motivating means then causing the said pouches to swing out angularly, the pouches simultaneously opening the mouths thereof during the said angular movement.

A further object of my invention is to provide means on the said pouches, remotely controllable from the operator's seat, in order to vary the closures provided at the bottom of the said pouches; consequently, varying the resistance to the air pressures forced through the said pockets during the course of motion or travel of the plane.

Other objects and ancillary advantages inherent in my invention will become apparent from an examination of the accompanying drawings, bearing further elucidation in the ensuing description, wherein like symbols are used to designate like parts, and in which:

Fig. 1 represents, in phantom, the top view of a plane incorporating the structural features of my invention shown in full lines.

Fig. 2 is a front view of Fig. 1 showing the actuation of the tail end of a plane downwardly; consequently, raising the nose of the plane so as to clear an obstruction immediately ahead thereof in its path of travel.

Fig. 3 is a top view similar to Fig. 1 showing the construction in enlargement so as to facilitate illustration of the detail components of the pouch construction.

Fig. 4 is a view looking in the direction of the arrows 4—4 of Fig. 3.

Fig. 5 is a cross-sectional view taken substantially on the lines 5—5 of Fig. 4.

Fig. 6 is a view looking in the direction of the arrows 6—6 of Fig. 3.

Fig. 11 is a view looking in the direction of the arrows 11—11 of Fig. 8.

Fig. 12 is a view looking in the direction of the arrows 12—12 of Fig. 11.

Fig. 13 is a cross-sectional view taken substantially on the lines 13—13 of Fig. 12.

Fig. 14 is a view looking in the direction of the arrows 14—14 of Fig. 1.

Fig. 15 is a sectional view taken substantially on the lines 15—15 of Fig. 14.

Fig. 16 is a view looking in the direction of the arrows 16—16 of Fig. 4.

Fig. 17 is a cross-sectional view taken substantially on the lines 17—17 of Fig. 16.

Fig. 17a is a view schematically showing how my invention is used to clear an obstruction to only one wing of a plane.

Figure 7:
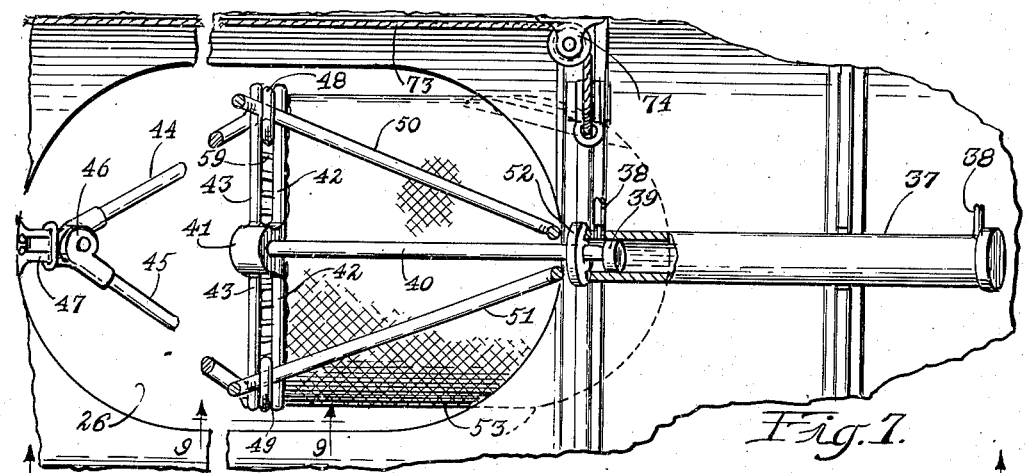
Fig. 7 is a view looking in the direction of the arrows 7—7 of Fig. 3.

Referring to the various views and in Figs. 1 and 2, a plane is generally designated 18, my invention being generally designated 19. The nose of the plane is designated 21 and the tail thereof 22. In Figs. 1 and 2, it is indicated how the obstruction 20 may be cleared by lowering the tail 22 of the plane 18; consequently, raising the nose 21 thereof causing it to travel upwardly to clear the obstruction 20, whenever that situation may occur, especially on days which are not clear, and which are especially foggy, when a pilot is apt to perceive suddenly the appearance of an obstruction or a building 20.

The airplane air brake means consist primarily of two pouches 29 which operate articulately swinging to the open position, or operative position, indicated in Figs. 1 and 2 by travelling approximately an angular ambit of 90° to open to operative position, and being concealable within a pocket 26 within the aft end 23 of the fuselage of the plane. The said pocket 26 being closed by doors 24 and 25, which are hingeably secured by suitable brackets 27 and 28, so as to form a complete enclosure when the pouches 29 are folded and positioned therein.

The pouch structure 29 consists of a mouth portion or structure made up of the arcuately shaped end elements 30 and 31, which may be of tubular construction and which are articulately secured at 32. At the opposite end, the elements 35 and 36 of smaller diametral magnitude may be tubular, and are also articulately secured to the rods 34 which telescope into the larger sections 33; the last-mentioned sections 33 being articulately connected to the termini of the arcuate sections 30 and 31. Thus, by means of the telescopic feature existent in the structural relationship of the elements 33 and 34 and by the articulate connection thereof to the sections 30, 31, 35, and 36, the mouth of the pouch 29 may be collapsed to the position indicated in Fig. 11.

To the mouth structure hereinbefore described, the pouches are attached by means of a series of loops 59, so as to permit the said pouches to be gathered together in the closed position when the telescopic structure would tend to shorten or lengthen the pouch structure, the pouch itself being made of a suitable, strong textile material 53 which has, at its top, a bowed out reinforcing element 54 of tubular construction or section, secured by means of the links 55 so as to hold the same rigidly when in operative position, yet permit the same to collapse when it is desired to conceal it within the pocket 26. The links 55 articulately operate at points 56 and 57 to facilitate collapsing of pouches 29, and also serve the purpose of maintaining tautly section 53 when pouches are open.

Each pouch is provided with a variable opening 64, which is controlled by attaching to the edge 62 at the bottom end of the pouch 29, cable strands 61 so as to bring the portion 60 thereof into closer adjustment with respect to the bowed out reinforcing element 54, the same being controlled by a cable 73 trained over pulleys 74 and trained over suitable pulleys 95, toward a manipulative control, generally designated 72, which will be presently described.

The cable 73 (see Fig. 17) is fitted within the bowed out portion or element 54, the end 76 thereof being connected to a tension spring 75, the terminus of the said spring being secured firmly at 77 of the bowed out reinforcing element and guide tube 54. The cable 73 is subdivided into a number of smaller strands 61, which are, in turn, secured at various points to the edge 62, so that by pulling or relaxing the tension on the cable 73, the edges 62 are both brought in closer proximity to the element 54, or permitted to be moved away therefrom; thus enlarging or reducing the opening 64 and permitting a lesser or greater quantity of air to pass upwardly therethrough for purposes which will be later explained.

Figs. 14 and 15 indicate how the adjustment of the open portion at the bottom of the pouches 29 is controlled, namely by a winch or pulley-winding mechanism 91 which winds or unwinds therefrom the cable 73, the same being operated when the knob or handle 85 is manipulated. The said handle 85 is secured to a driving gear 89. The said driving gear 89 rotates about the spindle 90, and is enmeshed with an intermediate pinion 87 pivoted about the stud 88, enmeshing with the internal gear 86 formed internally of the unit 72, so that by rotation of the handle 85 rotating the gear 89, rotary motion will be transmitted to the internal gear 86, depending on whether it is clockwise or counterclockwise direction, the cable 73 will be either wound thereon or unwound therefrom, thus actuating the cable 73 and its strands 61 to either enlarge the opening for the escape of air, or to control the same, or to completely close the edge 62 against the bowed out reinforcement guide support 54, or to permit the edge 62 to be completely open, as indicated at 63 in Fig. 3, when it is desired to collapse the pouches and to return them within the pocket 26 of the fuselage, at a time when the same are to be set to inoperative position; thus permitting the air to rush through readily without interfering with the manipulation for closing and collapsing the pouches 29.

The mechanism for motivating the pouches 29 to operative and inoperative positions consists of a motivating arrangement, see Fig. 7, which is primarily controlled by hydraulic means within the tubular confines 37, liquid being fed thereto from a suitable source of supply and connected through the inlet 38. The cylinder 37 contains a piston therein 39, having an extension 40 slidably operative in bottom 52, the extension 40 being secured to the hub-like structure 41, from which emanate the confining supports 42 and 43, holding therebetween the eyes 48 and 49, which are pivoted at 58 to the ends of rod elements 34. The rods 44 and 45 are articulately secured at 46 and at 97 to rods 34 to function in a vertical plane, and also articulately secured at 47 to articulate the assemblage of the opening and closing rods 44 and 45 in a horizontal plane; thus the composite structure of articulation at 46 and 47 providing a universally actuated joint.

The opening and closing of the pouches simultaneously with their being swung outwardly or inwardly, to operative and inoperative positions respectively, is aided by the motorized units 78 and 79 in connection with the switching means 71 by actuation of the switch to the proper position, the pointer 92 thereof indicating corresponding positions shown on the dial C, such as that designated 83, representing the closed position when the dial is actuated, or when the pointer 92 points to the point 83, as indicated in Fig. 14, the motorized equipment 78 and 79 will be actuated in the direction to cause the capstans 84 thereof to wind up the cable 65, and to pull the pouches inwardly by virtue of the cable 65 being connected to the mouths of the pouches with the aid of subdivided strands 66, 67, and 68. The cable 65 is trained over pulleys 69 and 70 (see Figs. 1 and 6), cable guides 93 being placed where needed. The closing of the pouches and their retraction is effectuated by the hydraulic means, the cable means is auxiliary structure balancing the operation.

Figure 8:
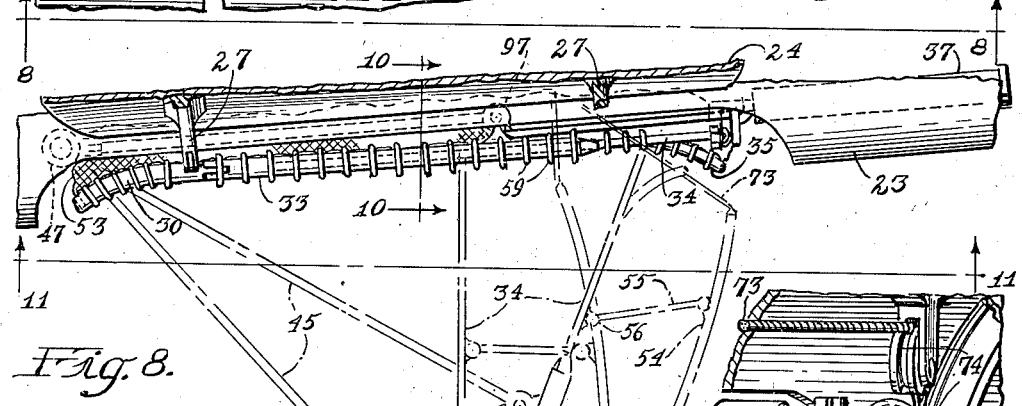
Fig. 8 is a view looking in the direction of the arrows 8—8 of Fig. 7.
Figures 9, 10:
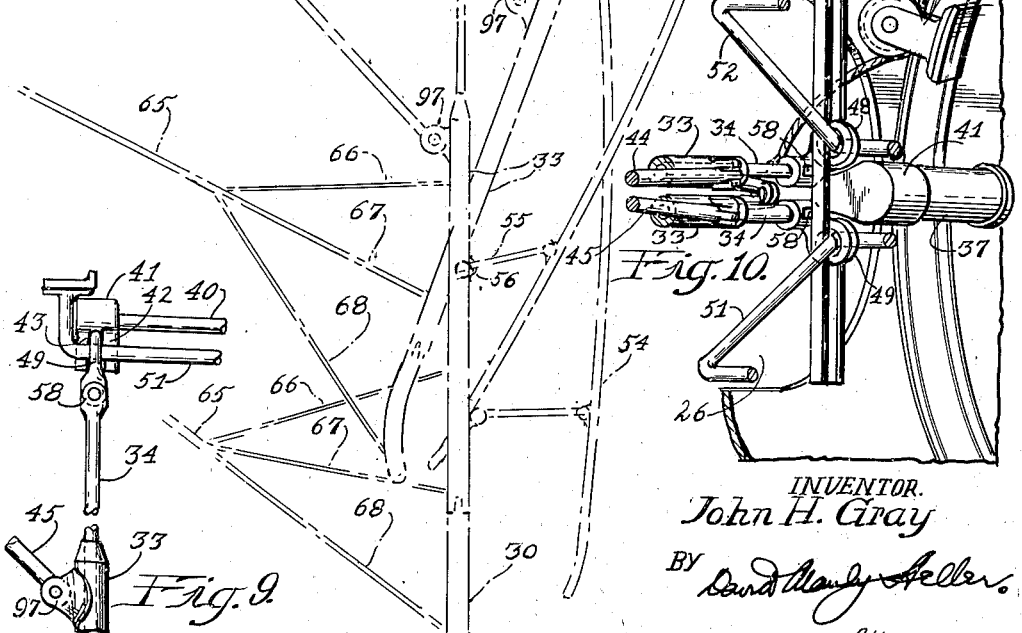
Fig. 9 is a view looking in the direction of the arrows 9—9 of Fig. 7.
Fig. 10 is a cross-sectional view taken substantially on the lines 10—10 of Fig. 8.

The elements 34, when actuated by the motorized equipment to open the unit, the motorized equipment being connected to the hydraulic system, causes the piston 39 to travel downwardly simultaneously guiding the eyes 48 and 49 over the guide rods 50 and 51 which are rigidly supported, hence causing the rods 44 and 45 to articulate about the pivot point 46 causing the mouths of the pouches to open upwardly, whereas at the point of articulation 47, by virtue of the spring urging action of the spring 94, an impetus will be furnished so as to start the mouth of the pouch outwardly, as indicated in Figs. 4 and 8; the arcuate sections 30, 31, 35, 36, and the telescopic sections 33 and 34 causing the expansion and opening of the mouths of the pouches by the aforesaid action of the hydraulic means. There are two motivating or manipulating units 72 so that each pouch may have its air releasing opening independently controlled, whereas the switching means also indicate at various points to which the pointer 82 may be set, at 81, namely, the left pouch will open; at the point 80, the right pouch will be opened; at the point 82, both right and left pouches will be opened simultaneously by the motorized means 78 and 79 as heretofore explained. When the switch 92 is set to the point 83, any one pouch that may be closed or, if both of them are open, they will be simultaneously closed.

The purpose of the cable structure 65 and the capstan 84 is to take up the slack, and sort of balance the operation of the hydraulic means during the closing or opening of the pouches and, especially, to act as a ballast for the movement of the pouches 29 inwardly and outwardly to inoperative or operative positions respectively.

The pipe 38 is also connected to suitable hydraulic valve control shown at 96 and the switching means 92 is coordinated so as to actuate the said valve, in order to provide the movement and power for opening the mouths of the pouches 29 and simultaneously swing them to operative or inoperative positions.

A plane, equipped with my invention, when traveling in a horizontal direction, and it is desired to brake its speed, the openings 64 of the pouches 29 are completely closed so that there is no opening between the edges 62 and the bowed out guide rods 54. However, in order to provide a degree of lift to the nose of the plane, the pouches 29 are set to have the proper dimensioned opening 64 which will permit air to strike the bottom portion 60 of the pouches and cause it to escape through the openings 64, thus having the tendency to push downwardly on the lower side of the pouch, when looking at Fig. 1, and thus cause the tail 22 to be deflected downwardly; consequently raising the nose 21 so as to clear an obstruction.

Looking at Fig. 1, and assuming that the axis of the plane were above the axis of the building or obstacle 20, in which event it would merely be necessary to clear the lower wing of the plane 19. By operating only the upper pouch 29 without operation of the lower pouch 29, the plane would be caused to tilt the upper wing downwardly about the axis of the plane, consequently, tilting upwardly the lower wing of the plane sufficiently to clear the height of the obstruction 20, illustrated in Fig. 2.

Another advantage of my construction is that the action of the pouches 29 may be completely nullified when the edges 62 are permitted to be completely opened as in 63, which setting is advantageously, especially when it is desired to manipulate the controls for collapsing the pouches 29, and for concealing them within the pockets 26 of the fuselage, so that no air resistance will impede the collapsing and closing operation.

A further advantage of the use of my pouches is evident when one considers that, in braking the action or travel of the plane in landing, the arresting of speed of the plane suddenly causes its nose to tilt downwardly and, in many instances, accidents have occurred through such sudden braking action. With my invention, the nose of the plane will be maintained in an upward direction, thus tending to prevent accidents to persons and damage to the plane resulting from its nose accidentally striking the surface of the landing field.

I believe that I have herein described, rather succinctly, the nature and the operation as well as the construction of my invention, so that persons familiar with the art will have no difficulty in grasping the teachings and principles of my invention and, inasmuch as the same is susceptible of modifications and improvements, all such modifications and improvements within the spirit and scope of my invention are understood to be deemed a part of my invention, or any modifications, alterations impliably suggested or embraced in the accompanying drawings, or any that may fall within the purview of the foregoing claims, and that I am not to be limited or restricted to the specific showing and illustration herein made a part of the instant application; my invention to be limited only by the subjoined or appended claims.

Having thus disclosed and revealed my invention, what I claim as new, and desire to secure by Letters Patent, is:

1. Airplane air brake means comprising, a pair of pouches mounted horizontally on opposed sides of the fuselage of a plane at a point intermediate the tail and wing portions thereof, control means operable from a remote point for setting and retracting optionally either of the said pouches to operative and inoperative positions, each of the said pouches being provided with openings adjacent the bottom portions thereof, and adjusting means remotely controllable from the operator's position to vary the air braking resistance of the said pouches from nullity to maximum.

2. Airplane air brake means comprising, a pair of pouches mounted horizontally on opposed sides of the fuselage of a plane at a point intermediate the tail and wing portions thereof, hydraulic control means operable from a remote point for setting and retracting optionally either of the said pouches to operative and inoperative positions, each of the said pouches being provided with openings adjacent the bottom portions thereof, and adjusting means remotely controllable from the operator's position to vary the air braking resistance of the said pouches from nullity to maximum.

3. Airplane air brake means comprising, a pair of pouches mounted horizontally on opposed sides of the fuselage of a plane at a point intermediate the tail and wing portions thereof, control means operable from a remote point for setting and retracting optionally either of the said pouches to operative and inoperative positions, cable ballast means cooperating with the said control means to reinforce the support of the said pouches in operative position and simultaneously to cushion the action of the said control means during the setting and retracting movements, each of the said pouches being provided with openings adjacent the bottom portions thereof, and adjusting means remotely controllable from the operator's position to vary the air braking resistance of the said pouches from nullity to maximum.

4. Airplane air brake means comprising, a pair of pouches mounted horizontally on opposed sides of the fuselage of a plane at a point intermediate the tail and wing portions thereof, hydraulic control means operable from a remote point for setting and retracting optionally either of the said pouches to operative and inoperative positions, cable ballast means cooperating with the said control means to reinforce the support of the said pouches in operative position and simultaneously to cushion the action of the said control means during the setting and retracting movements, each of the said pouches being provided with openings adjacent the bottom portions thereof, and adjusting means remotely controllable from the operator's position to vary the air braking resistance of the said pouches from nullity to maximum.

5. Airplane air brake means comprising, a pair of pouches mounted horizontally on opposed sides of the fuselage of a plane at a point intermediate the tail and wing portions thereof, control means operable from a remote point for setting and retracting optionally either of the said pouches to operative and inoperative positions, each of the said pouches being provided with openings adjacent the bottom portions thereof, and adjusting means remotely controllable from the operator's position to vary the air braking resistance of the said pouches from nullity to maximum, each of the said pouches being further provided with collapsible mouth means coordinately cooperative with the said control means to be expanded simultaneously with the setting operation and to be collapsed simultaneously with the retracting operation.

6. Airplane air brake means comprising, a pair of pouches mounted horizontally on opposed sides of the fuselage of a plane at a point intermediate the tail and wing portions thereof, hydraulic control means operable from a remote point for setting and retracting optionally either of the said pouches to operative and inoperative positions, each of the said pouches being provided with openings adjacent the bottom portions thereof, and adjusting means remotely controllable from the operator's position to vary the air braking resistance of the said pouches from nullity to maximum, each of the said pouches being further provided with collapsible mouth means coordinately cooperative with the said control means to be expanded simultaneously with the setting operation and to be collapsed simultaneously with the retracting operation.

7. Airplane air brake means comprising, a pair of pouches mounted horizontally on opposed sides of the fuselage of a plane at a point intermediate the tail and wing portions thereof, control means operable from a remote point for setting and retracting optionally either of the said pouches to operative and inoperative positions, cable ballast means cooperating with the said control means to reinforce the support of the said pouches in operative position and simultaneously to cushion the action of the said control means during the setting and retracting movements, each of the said pouches being provided with openings adjacent the bottom portions thereof, and adjusting means remotely controllable from the operator's position to vary the air braking resistance of the said pouches from nullity to maximum, each of the said pouches being further provided with collapsible mouth means coordinately cooperative with the said control means to be expanded simultaneously with the setting operation and to be collapsed simultaneously with the retracting operation.

8. Airplane air brake means comprising, a pair of pouches mounted horizontally on opposed sides of the fuselage of a plane at a point intermediate the tail and wing portions thereof, hydraulic control means operable from a remote point for setting and retracting optionally either of the said pouches to operative and inoperative positions, cable ballast means cooperating with the said control means to reinforce the support of the said pouches in operative position and simultaneously to cushion the action of the said control means during the setting and retracting movements, each of the said pouches being provided with openings adjacent the bottom portions thereof, and adjusting means remotely controllable from the operator's position to vary the air braking resistance of the said pouches from nullity to maximum, each of the said pouches being further provided with collapsible mouth means coordinately cooperative with the said control means to be expanded simultaneously with the setting operation and to be collapsed simultaneously with the retracting operation.

9. An airplane having a fuselage, a concealing pocket in the aft portion thereof, a pair of doors hingedly secured to each side of the said concealing pocket, airplane air brake means comprising, a pair of pouches mounted horizontally on opposed sides of the said fuselage at a point intermediate the tail and wing portions thereof, control means operable from a remote point for setting and retracting optionally either of the said pouches to operative and inoperative positions, each of the said pouches being provided with openings adjacent the bottom portions thereof, and adjusting means remotely controllable from the operator's position to vary the air braking resistance of the said pouches from nullity to maximum, each of the said pouches being further provided with collapsible mouth means coordinately cooperative with the said control means to be expanded simultaneously with the setting operation and to be collapsed simultaneously with the retracting operation, the said pouches being retractably and releasably confined in the said concealing pocket, the said control means being connected to the said doors effectuating their instant release to open position as soon as the pouch setting operation is initiated.

10. An airplane having a fuselage, a concealing pocket in the aft portion thereof, a pair of doors hingedly secured to each side of the said concealing pocket, airplane air brake means comprising, a pair of pouches mounted horizontally on opposed sides of the said fuselage at a point intermediate the tail and wing portions thereof, hydraulic means operable from a remote point for setting and retracting optionally either of the said pouches to operative and inoperative positions, each of the said pouches being provided with openings adjacent the bottom portions thereof, and adjusting means remotely controllable from the operator's position to vary the air braking resistance of the said pouches from nullity to maximum, each of the said pouches being further provided with collapsible mouth means coordinately cooperative with the said control means to be expanded simultaneously with the setting operation and to be collapsed simultaneously with the retracting operation, the said pouches being retractably and releasably confined in the said concealing pocket, the said control means being connected to the said doors effectuating their instant release to open position as soon as the pouch setting operation is initiated.

11. An airplane having a fuselage, a concealing pocket in the aft portion thereof, a pair of doors hingedly secured to each side of the said concealing pocket, and airplane air brake means comprising, a pair of pouches mounted horizontally on opposed sides of the said fuselage at a point intermediate the tail and wing portions thereof, control means operable from a remote point for setting and retracting optionally either of the said pouches to operative and inoperative positions, cable ballast means cooperating with the said control means to reinforce the support of the said pouches in operative position and simultaneously to cushion the action of the said control means during the setting and retracting movement, each of the said pouches being provided with openings adjacent the bottom portions thereof, and adjusting means remotely controllable from the operator's position to vary the air braking resistance of the said pouches from nullity to maximum, each of the said pouches being further provided with collapsible mouth means coordinately cooperative with the said control means to be expanded simultaneously with the setting operation and to be collapsed simultaneously with the retracting operation, the said pouches being retractably and releasably confined in the said concealing pocket, the said control means being connected to the said doors effectuating their instant release to open position as soon as the pouch setting operation is initiated.

12. An airplane having a fuselage, a concealing pocket in the aft portion thereof, a pair of doors hingedly secured to each side of the said concealing pocket, and airplane air brake means comprising, a pair of pouches mounted horizontally on opposed sides of the said fuselage at a point intermediate the tail and wing portions thereof, hydraulic control means operable from a remote point for setting and retracting optionally either of the said pouches to operative and inoperative positions, cable ballast means cooperating with the said control means to reinforce the support of the said pouches in operative position and simultaneously to cushion the action of the said control means during the setting and retracting movements, each of the said pouches being provided with openings adjacent the bottom portions thereof, and adjusting means remotely controllable from the operator's position to vary the air braking resistance of the said pouches from nullity to maximum, each of the said pouches being further provided with collapsible mouth means coordinately cooperative with the said control means to be expanded simultaneously with the setting operation and to be collapsed simultaneously with the retracting operation, the said pouches being retractably and releasably confined in the said concealing pocket, the said control means being connected to the said doors effectuating their instant release to open position as soon as the pouch setting operation is initiated.

JOHN H. GRAY.

REFERENCES CITED

The following references are of record in the file of this patent:

UNITED STATES PATENTS

| Number | Name | Date |
| --- | --- | --- |
| 1,299,395 | Clayton | Apr. 1, 1919 |
| 1,567,229 | Bohler | Dec. 29, 1925 |

FOREIGN PATENTS

| Number | Country | Date |
| --- | --- | --- |
| 272,207 | Italy | Mar. 3, 1930 |